US008888343B2

(12) United States Patent
De Lamberterie

(10) Patent No.: US 8,888,343 B2
(45) Date of Patent: Nov. 18, 2014

(54) OPTICAL DEVICE AND SIGNALING AND/OR LIGHTING SYSTEM

(75) Inventor: Antoine De Lamberterie, Paris (FR)

(73) Assignee: Valeo Vision, Bobigny (FR)

( * ) Notice: Subject to any disclaimer, the term of this patent is extended or adjusted under 35 U.S.C. 154(b) by 211 days.

(21) Appl. No.: 13/535,604

(22) Filed: Jun. 28, 2012

(65) Prior Publication Data

US 2013/0003399 A1 Jan. 3, 2013

(30) Foreign Application Priority Data

Jun. 30, 2011 (FR) ...................................... 11 55857

(51) Int. Cl.
*F21S 8/10* (2006.01)
*F21V 8/00* (2006.01)

(52) U.S. Cl.
CPC ......... *F21S 48/1241* (2013.01); *F21S 48/2281* (2013.01); *F21S 4/2262* (2013.01); *F21S 48/2268* (2013.01); *F21S 48/215* (2013.01); *F21S 48/2243* (2013.01); *F21S 48/115* (2013.01); *F21S 48/2237* (2013.01); *G02B 6/001* (2013.01)
USPC ........................................................ 362/511

(58) Field of Classification Search
CPC ........ G02B 1/045; G02B 6/00; G02B 6/0001; G02B 6/0023; G02B 6/0028; G02B 6/0075; G02B 6/0078; G02B 6/0068; G02B 6/0073
See application file for complete search history.

(56) References Cited

U.S. PATENT DOCUMENTS

| 5,876,107 A * | 3/1999 | Parker et al. ................... 362/600 |
| 5,926,601 A * | 7/1999 | Tai et al. ........................ 385/146 |
| 6,550,952 B1 * | 4/2003 | Hulse et al. .................... 362/555 |
| 7,946,743 B2 | 5/2011 | Natsume et al. |
| 2001/0017773 A1 * | 8/2001 | Suzuki et al. ................... 362/26 |
| 2009/0154186 A1 | 6/2009 | Natsume et al. |
| 2011/0007518 A1 | 1/2011 | de Lamberterie |

FOREIGN PATENT DOCUMENTS

| DE | 102005021079 | 11/2006 |
| DE | 102007005779 | 8/2008 |
| EP | 2071228 | 6/2009 |
| FR | 2947325 | 12/2010 |
| JP | 2006236588 | 9/2006 |

* cited by examiner

*Primary Examiner* — Bao Q Truong
(74) *Attorney, Agent, or Firm* — Jacox, Meckstroth & Jenkins

(57) ABSTRACT

An optical device comprising an exit portion furnished with an exit face and designed to emit, through the exit face, light rays emanating from a first luminous source and from a second luminous source, characterized by the fact that it comprises a first light guide configured to propagate the light rays emanating from the first luminous source toward the exit portion and a second light guide configured to propagate the light rays emanating from the second source toward the exit portion.

A preferential application is the field of lighting equipment for motor vehicles.

20 Claims, 4 Drawing Sheets

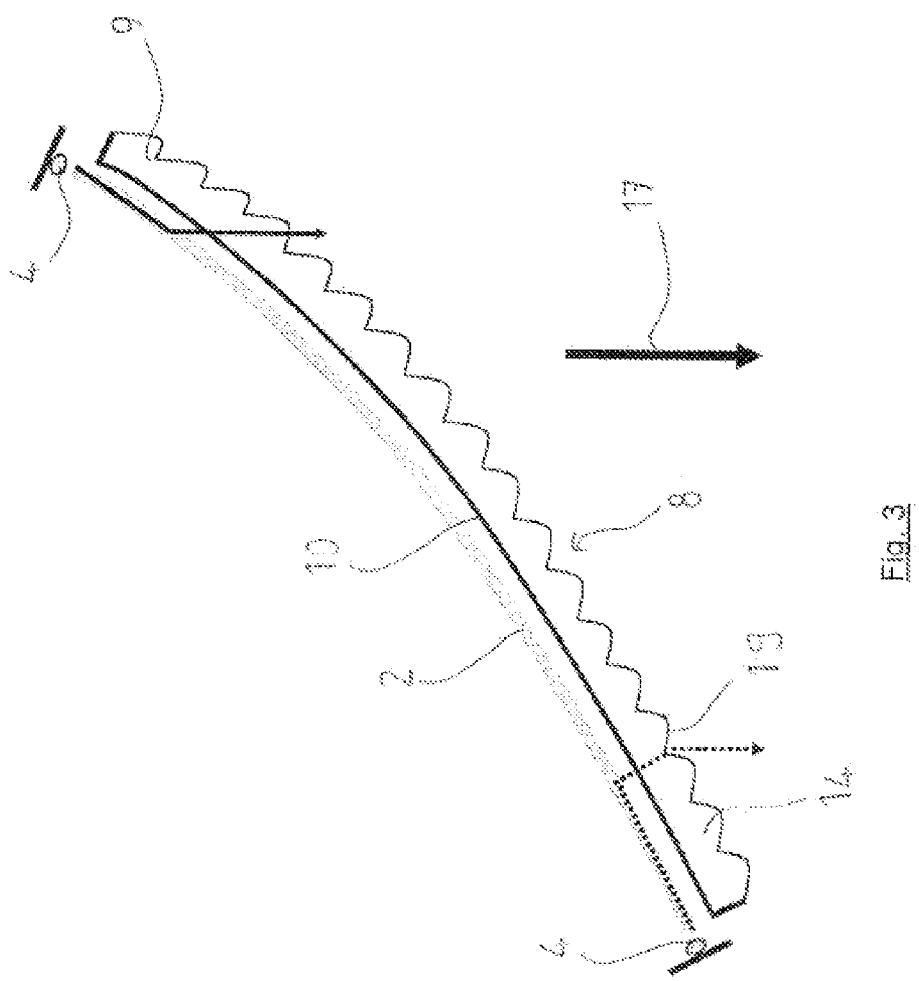

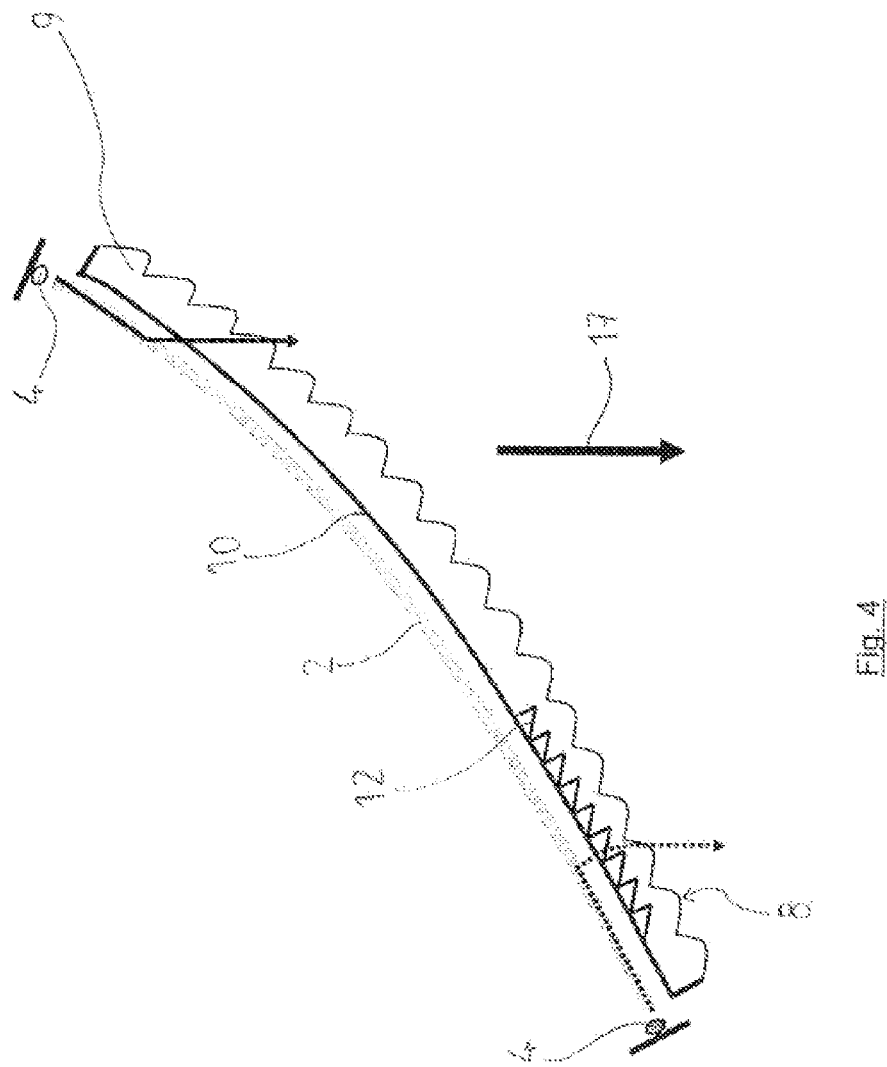

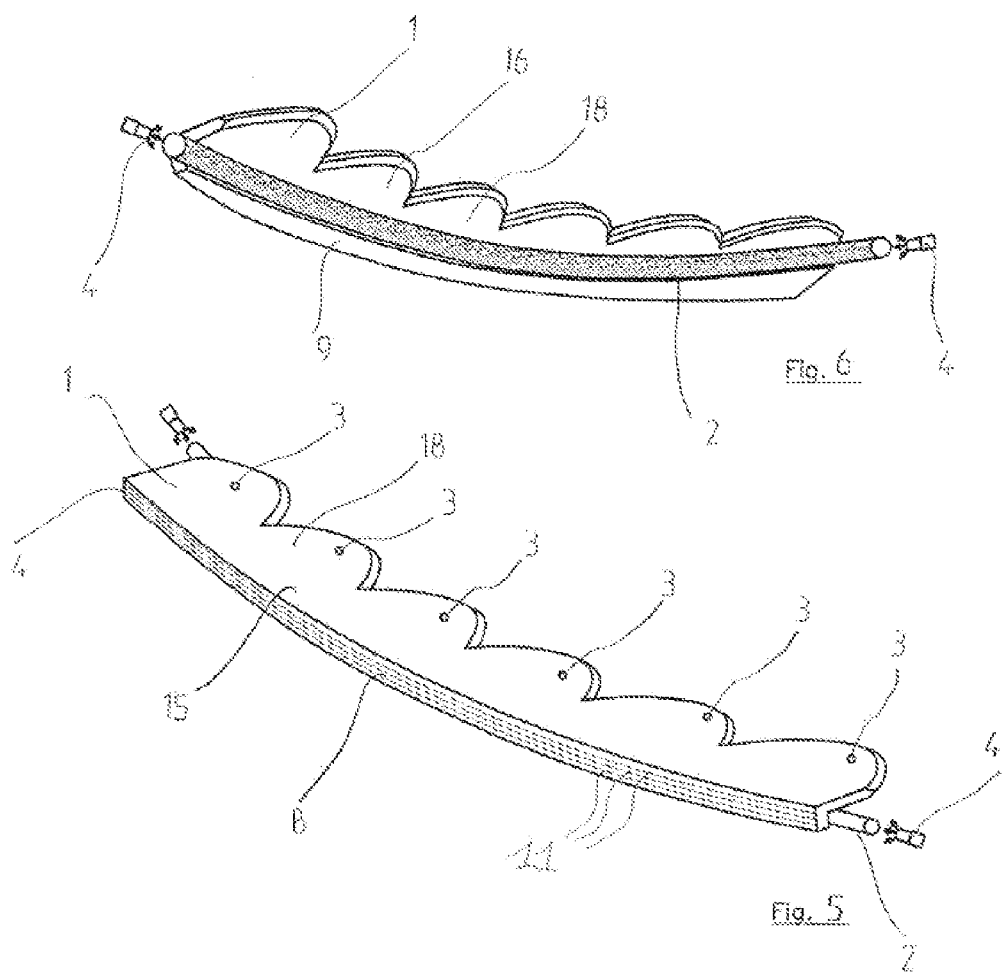

OPTICAL DEVICE AND SIGNALING AND/OR LIGHTING SYSTEM

CROSS-REFERENCE TO RELATED APPLICATIONS

This application claims priority to French Application No. 1155857 filed Jun. 30, 2011, which application is incorporated herein by reference and made a part hereof.

BACKGROUND OF THE INVENTION

1. Field of the Invention

The present invention pertains especially to an optical device and to a lighting and/or signaling system. A preferred application relates to the automobile industry, for vehicle equipment.

2. Description of the Related Art

In the field of optical devices for vehicles, the most conventional techniques consist in carrying out separately the various desired lighting or signaling functions such as: full beam headlight, dipped beam headlight, change-of-direction indicator light or else for example daytime lighting also referred to by its English acronym DRL (Day Running Light).

With the general aim of improving the bulkiness and the visual rendition of luminous systems, there exists in the prior art, optical modules which ally several lighting and/or signaling functions. Thus, document FR-A-2 947 325, which is equivalent to U.S. Patent Publication 2011/0007518, which is incorporated herein by reference and made a part hereof, discloses an optical device furnished with at least two luminous sources each carrying out a function, and with a light guide having a common exit face for the light rays emanating from the two sources. The light guide is common to the two sources, this not being devoid of drawbacks:

- either the luminous sources (for example LEDs, light-emitting diodes) are placed side by side facing an entrance face of the guide which is then sheet shaped and the entrance axis of the light guide is placed between the two luminous sources. The overall effectiveness of the device, that is to say the luminous power of the light exiting the guide relative to the luminous power of the light entering the guide, is not optimal. It is also noted that the homogeneity of the illumination on the exit face is not optimal, especially if the light guide is highly arced;
- or a system for coupling the luminous sources is put in place in an upstream part of the path of the rays, which coupling system induces consequent losses in practice. For example, losses by absorption of the order of 50% are frequent for lengths of cylindrical guide serving for coupling of the order of 300 mm.

SUMMARY OF THE INVENTION

The invention makes it possible to solve all or some of the drawbacks of the current techniques.

It relates in particular to an optical device comprising an exit portion furnished with an exit face and designed to emit, through the exit face, light rays emanating from a first and from a second luminous source.

In an advantageous manner, this device is such that it comprises a first light guide configured to propagate the light rays emanating from the first luminous source toward the exit portion and a second light guide, preferably distinct from the first light guide, configured to propagate the light rays emanating from the second source toward the exit portion.

Thus, the lighting and/or signaling functions dedicated to the two sources are carried out by one and the same exit surface of the device but, for all that, the paths of the light rays emanating from each of the sources are differentiated, through the implementation of distinct light guides. It is then possible to design a very appropriate light guide for each function.

According to one possibility, the exit portion is integrated into the first light guide. Thus, a continuity of material is effected so as to produce in an integral manner the first guide and the exit portion. According to one aspect, the exit portion is simply a downstream end of the first guide, in which a prolongation has been formed, oriented along the thickness of the first light guide.

It is also possible advantageously to contrive matters such that the prolongation defines an entrance surface for light rays exiting from an exit surface of the second light guide. Thus, the second light guide may be placed at the rear of the prolongation following the direction of the light rays, the rays emanating from the two sources reuniting solely in the exit portion, allowing the designer complete latitude to adapt each light guide to the function ascribed thereto.

Other optional characteristics which may be implemented in a combined or alternative manner are indicated hereinafter:

- the entrance surface is situated at the rear of the prolongation with respect to the exit face;
- the exit surface of the second light guide has a height less than or equal to the height of the entrance surface, along the thickness of the first light guide;
- the entrance surface comprises a relief for deviating the light rays exiting the second light guide;
- the deviating relief comprises a plurality of parallel striations oriented along the thickness of the first light guide;
- the first light guide comprises a sheet-shaped principal propagation zone;
- the second light guide is a cylindrical guide;
- the longitudinal direction of the cylindrical guide is substantially different from the direction of propagation of the light rays in the principal propagation zone;
- the exit face comprises a relief for deviating the rays passing through the exit portion;
- the relief of the exit face comprises a plurality of parallel striations oriented along the thickness of the first light guide;
- the relief of the exit face comprises a plurality of parallel striations oriented transversely to the thickness of the first light guide.

The invention is also concerned with a lighting and/or signaling system comprising at least one first and one second luminous source and an optical device according to the invention.

According to an advantageous possibility, the second light guide is a cylindrical guide and in which the second luminous source comprises a pair of light-emitting diodes, each at one end of the cylindrical guide. Optionally, the second luminous source is configured to emit a daytime lighting flux.

Moreover, one possibility is that the first luminous source is configured to emit a change-of-direction indicator light flux.

The invention also relates to a vehicle equipped with at least one system such as introduced hereinabove.

Other characteristics, aims and advantages of the present invention will become apparent on reading the detailed description which follows, and with regard to the appended drawings given by way of nonlimiting examples and in which:

BRIEF DESCRIPTION OF THE ACCOMPANYING DRAWINGS

FIG. 3 presents a variant of the invention in longitudinal section;

FIG. 4 illustrates another variant in longitudinal section; and

FIGS. 5 and 6 give two illustrations in perspective of an exemplary device according to the invention.

DETAILED DESCRIPTION OF THE PREFERRED EMBODIMENTS

In a general manner, the present invention can use luminous sources of the light-emitting diode type also commonly called LEDs. In particular, these LEDs may be furnished with at least one microchip able to emit light whose intensity and color are tailored to the lighting and/or signaling function to be carried out. For example, a first luminous source can comprise at least one LED for achieving lighting in amber light for a change-of-direction flashing indicator light function. Moreover a second light source can comprise at least one white light LED for achieving a daytime lighting function. The number of LEDs is, however, not limiting of the invention, nor even the number of functions that may be implemented by the overall system of the invention. Moreover, the term luminous source is understood here as a set of at least one elementary source such as an LED able to produce a flux leading to the generation at the exit of the device of the invention of an exit flux fulfilling the desired function. By way of preferred example, the second luminous source of the invention comprises a pair of LEDs each disposed at one end of a second luminous guide which will be described in detail hereinafter.

The optical device presented here advantageously exploits the existing techniques as regards light guides, allowing the propagation of light rays emitted by a light source through the medium constituting the guide. For example, the first and the second light guides 1, 2 represented particularly in FIGS. 1 and 2, may be produced from materials such as PMMA (polymethyl methacrylate), PC (polycarbonate), silicone or the like and with a preferred refractive index of between 1.49 and 1.59.

Figure 1:
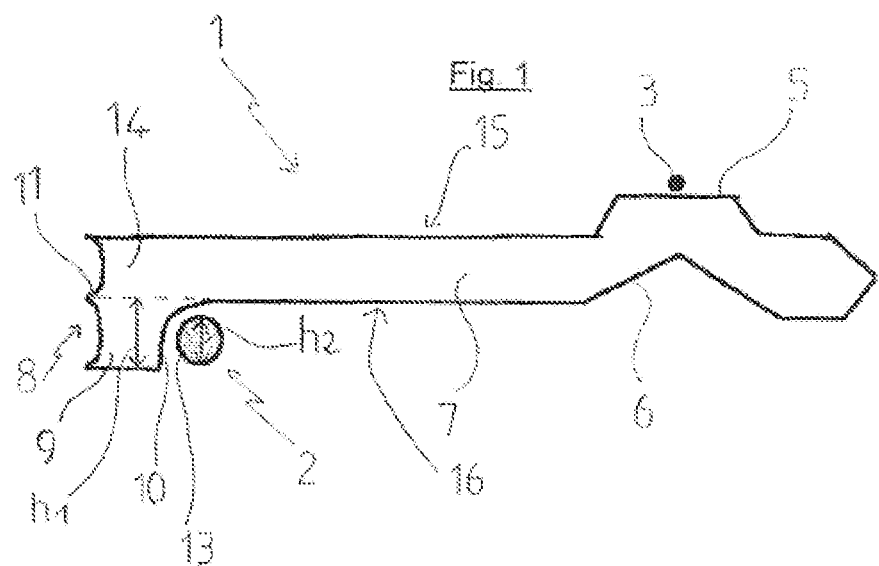
FIG. 1 is a view in transverse section of a device according to the invention.

A preferred embodiment of a first light guide 1 is represented in FIG. 1 in transverse section, that is to say along the direction of propagation of the rays in a principal propagation zone 7. The first light guide 1 comprises an entrance face 5 through which the light rays emanating from a first luminous source 3 are admitted. From the entrance face 5, the rays follow a path firstly oriented mainly along the thickness of the first light guide 1 and undergo at least one reflection on a reflection surface 6 so as to direct the rays reflected into a principal propagation zone 7. At least the principal propagation zone 7 can exhibit the form of a guidance sheet, that is to say of a substantially two-dimensional guide (with a lower thickness in relation to the length) that may possibly be inwardly curved to adopt a given arc.

The principal propagation zone 7 is delimited vertically by an upper guidance face 15 and a lower guidance face 16. The two guidance faces 15 and 16 are advantageously parallel and spaced apart in such a way that the principal propagation zone 7 exhibits a constant vertical thickness which is small relative to its longitudinal and transverse dimensions.

The present invention allows complete freedom of shape and of dimensions in respect of the sheet and great freedom of design of the first light guide 1 in order to adapt it to the function to be carried out by way of the first luminous source 3.

Figure 2:
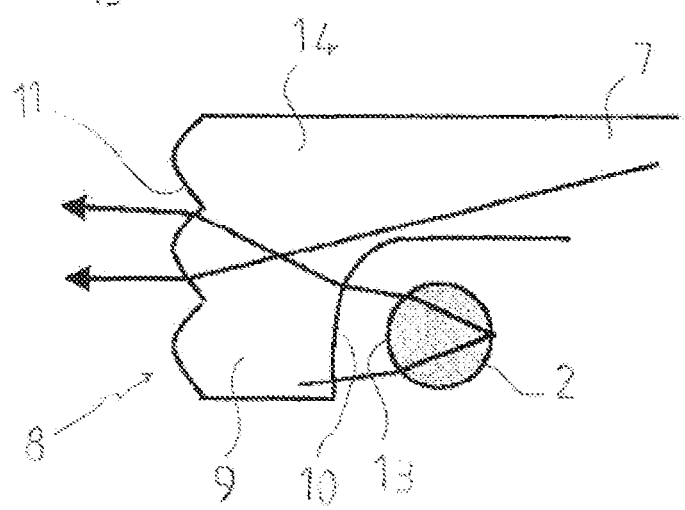
FIG. 2 shows in greater detail the cooperation between two light guides according to the invention.

The principal propagation zone 7 of the first light guide 1 is prolonged by an exit portion 14 presented in a first embodiment in FIG. 1 and according to a variant in FIG. 2. In the case of FIG. 1, the exit portion 14 exhibits an external surface able to constitute the exit face 8 for the light rays emanating from the device of the invention. In the case represented, the exit face 8 comprises a portion of its thickness in the continuity of the thickness of the principal propagation zone 7 of the first light guide 1. Another part of its thickness forms a protuberance oriented substantially along the thickness of the principal propagation zone 7 of the first light guide 1. A prolongation 9 is thus constructed which, in the case of the figures, is oriented downwards, away from the entrance face 5 for the rays of the first luminous source 3. This case is, however, not limiting and it is equally possible to construct the prolongation 9 oriented upwards and in consonance with the side where the entrance face 5 of the first light guide 1 is situated.

The prolongation 9 starts at a height level corresponding to the level of one of the guidance faces 15, 16—here the guidance face 16—and continues in the direction away from the other guidance face—here the guidance face 15.

In FIG. 1, the start of the prolongation 9 is shown diagrammatically by dashes.

The prolongation 9 of the exit portion 14 produces a space situated at the rear of the exit face 8 with respect to the direction of propagation of the rays, in which space a second light guide 2 may be integrated, such as in the case illustrated. In this situation, the second light guide 2 emits light rays through an exit surface 13 which are able to enter the exit portion 14 through an entrance surface 10 situated at the level of the prolongation 9 and advantageously at the rear of the exit portion 14 with respect to the exit face 8. The course of the light rays emanating from the first light guide 1 and from the second light guide 2 is particularly visible in FIG. 2.

Advantageously, the height h1 of the prolongation 9 (that is to say its dimension along the thickness of the principal propagation zone 7) is greater than or equal to the height h2 of the exit surface 13 of the second light guide 2. For example, this height h1 is equal to 7 mm. Moreover, the entrance surface 10 for the rays emanating from the second light guide 2 can be given the appropriate shape to direct these rays in the desired direction so as to produce the exit beam of the device appropriate to the desired function. By way of example, the entrance surface 10 exhibits a curvature such as visible in FIGS. 1 and 2 in a plane transverse to the principal direction of propagation in the principal propagation zone 7.

Preferably, the second light guide 2 is a guide of cylindrical type, that is to say consisting of an essentially elongate body advantageously of substantially circular cross section although this is not limiting of the invention. A circular cross section is revealed in FIGS. 1 and 2. Approximating, especially oval, cross sections can satisfy the definition of cylindrical guides. As is represented in FIGS. 3 and 4, employing guides of this type makes it possible to site a part of the second luminous source 4 at one end of the second light guide 2 and advantageously to site two elementary sources of the second luminous source 4 each at one end of the second light guide 2. Employing a cylindrical guide as the second light guide 2 makes it possible to orient it substantially transversely to the sheet constituting the principal propagation zone 7 of the first light guide 1. This also makes it possible to integrate the second light guide 2 within the height of the prolongation 9.

Advantageously, the longitudinal profile of the second light guide 2 follows the profile of the entrance surface. An example of these substantially parallel profiles emerges from FIGS. 3 and 4.

The exit face 8 can exhibit reliefs suitable for forming a deviation of the beams emanating from each of the sources. In the case of FIG. 1, the reliefs consist of striations 11 oriented substantially along the longitudinal direction of the edge of the first light guide 1. In FIG. 1, these longitudinal striations form re-entrant concavities in the exit portion 14. By way of variant, FIG. 2 shows longitudinal striations 11 of convex profile on the exit face 8. In these two illustrations, the longitudinal striations 11 define respectively a substantially arced convexity and a substantially arced concavity. This case is, however, not limiting and other profiles may be implemented especially prismatic profiles. These types of reliefs make it possible to spread the exiting flux and increase its homogeneity.

An exemplary embodiment of the invention has been represented in FIG. 3 making it possible to portray the path followed by rays emanating from two elementary sources constituting the second luminous source 4. More particularly, a profile of the exit face 8 is presented therein with a plurality of reliefs here in the form of striations 19 directed along the thickness of the principal propagation zone 7, that is to say extending transversely to the longitudinal direction of the first light guide 1. These transverse striations 19 allow a deviation of the rays from the second luminous source 4 so as to right them if necessary. More precisely, as represented in FIG. 3, the second luminous source 4 comprises two elementary sources, each at one end of the cylindrical second light guide 2. In regard to the optical axis 17 desired for the exit of the flux carrying out the photometric function dedicated to the second luminous source 4, the orientation of the rays emanating from the part situated toward the top right of the figure of the optical guide does not pose any difficulty. On the other hand, the orientation of the rays emanating from the part of the second light guide 2 situated toward the bottom left part of FIG. 3 requires righting. This righting is advantageously produced by virtue of the exit portion 14 of the invention, by defining an exit face profile 8 suited to a consequent deviation of the exiting rays. The dotted luminous path represents this righting.

As a variant, not represented here, the transverse striations 19 may exhibit a convex profile.

The exit face 8 can comprise a combination of longitudinal striations 11 and/or transverse striations 19, these striations 11 and/or 19 exhibiting, each and independently of the other striations 11 and/or 19, a prismatic profile, such as for example one of those aforementioned.

As a variant, the exit face 8 may be devoid of longitudinal striations 11 and/or transverse striations 19, and may in particular be smooth.

FIG. 4 represents another variant of the invention in which the entrance surface 10 of the exit portion 14 comprises a relief for deviating the light rays exiting the second light guide 2. This relief may be formed in an alternative manner to the relief of the exit face 8 or, as is the case in the illustration, as a supplement. This combination of reliefs allows effective righting of the rays emanating from the second luminous source 4. In the case illustrated, the relief formed on the entrance surface 10 of the exit portion 14 corresponds to a plurality of striations 12 oriented along the thickness of the principal propagation zone 7 (or else the height of the exit portion 14). Non-limitingly, prismatic shaped striations 12 have been represented. In the case of combined use of reliefs on the exit face 8 and on the entrance surface 10, these reliefs supplement one another effectively for the righting and the spreading of the rays toward the optical axis 17. It will be noted that it is not systematic to have to make reliefs over the whole of the length of the entrance surface 10. In particular, the presence of reliefs useful for the righting of the rays is mainly justified over the zone corresponding to that part of the second light guide 2 for which the rays must be righted the most, especially with a righting of greater than 90°. The shapes and dimensions of the set of the reliefs described hereinabove may moreover evolve along the exit portion 14.

It will be noted that in the case represented the exit portion 14 constitutes a continuity of the first light guide 1. The width of this zone is not limited by the invention. In a general manner, a width of the order of 5 to 30 millimeters may be satisfactory and more precisely a width of 10 to 15 millimeters will in most cases be suitable.

FIGS. 5 and 6 make it possible to illustrate the entirety of the device seen in perspective.

FIG. 5 is a view of the invention via the face 15 of the first light guide 1.

Two elementary sources are arranged, at each end of the device, to produce the second luminous source 4. Here the first light guide 1 has the shape of a guidance sheet, as in the previous cases. It cooperates with plurality of elementary sources constituting the first luminous source 3. Each elementary source is for example at least one light-emitting diode. They are, in the illustration of FIG. 5, spaced regularly apart along the lengthwise dimension of the first light guide 1 and are located at the rear of the first guide 1, away from the exit face 8, as was already visible in FIG. 1. The exit face 8 exhibits longitudinal striations 11, extending along the whole of the exit face 8. The exit face 8 is devoid of transverse striations.

In the embodiment of FIGS. 5 and 6, each elementary source of the first luminous source 3 is situated in a lobe-shaped zone 18 of the first light guide 1. The slice of the first light guide 1 away from the exit face 8 thus has a longitudinal profile provided with undulations. The lobes 18 are also visible in FIG. 6, via the face 16 of the first light guide 1. This figure furthermore reveals the second light guide 2 over its entire length, at the rear of the prolongation 9. The latter exhibits moreover in this variant a width increasing from one longitudinal end of the device, to the other end.

The invention is not limited to the embodiments described but extends to any embodiment in accordance with the spirit thereof.

While the system, apparatus and method herein described constitute preferred embodiments of this invention, it is to be understood that the invention is not limited to this precise system, apparatus and method, and that changes may be made therein without departing from the scope of the invention which is defined in the appended claims.

What is claimed is:

1. An optical device comprising an exit portion furnished with an exit face and designed to emit, through said exit face, light rays emanating from a first luminous source and from a second luminous source, said optical device comprising:
   a first light guide configured to propagate said light rays emanating from said first luminous source toward said exit portion; and
   a second light guide, distinct from said first light guide and configured to propagate said light rays emanating from said second luminous source toward said exit portion;
   wherein said exit portion is integrated into said first light guide;

wherein said exit portion comprises a prolongation of said first light guide oriented along a thickness of said first light guide.

2. The optical device according to claim 1, in which said prolongation defines an entrance surface for light rays exiting from an exit surface of said second light guide.

3. The optical device according to claim 2, in which said entrance surface is situated at a rear of said prolongation with respect to said exit face.

4. The optical device according to claim 3, in which said exit surface of said second light guide has a height less than or equal to a height of said entrance surface, along a thickness of said first light guide.

5. The optical device according to claim 1, in which said first light guide comprises a sheet-shaped principal propagation zone.

6. The optical device according to claim 1, in which said second light guide is a cylindrical guide.

7. An optical device comprising an exit portion furnished with an exit face and designed to emit, through said exit face, light rays emanating, from a first luminous source and from a second luminous source, said optical device comprising:
- a first light guide configured to propagate said light rays emanating from said first luminous source toward said exit portion; and
- a second light guide, distinct from said first light guide and configured to propagate said light rays emanating from said second luminous source toward said exit portion;
- wherein said exit portion is integrated into said first light guide;
- wherein said first light guide comprises a sheet-shaped principal propagation zone, and said second light guide is a cylindrical guide and in which a longitudinal direction of said cylindrical second light guide is substantially perpendicular to a direction of propagation of said light rays in said principal propagation zone.

8. The optical device according to claim 1, in which said exit face comprises a relief for deviating said light rays passing through said exit portion.

9. The optical device according to claim 8, in which said relief of said exit face comprises a plurality of parallel striations oriented along a thickness of said first light guide.

10. The optical device according to claim 8, in which said relief of said exit face comprises a plurality of parallel striations oriented transversely to a thickness of said first light guide.

11. A lighting system comprising a first luminous source, a second luminous source and a device according to claim 1.

12. The lighting system according to claim 11, in which said second light guide is a cylindrical guide and in which said second luminous source comprises a pair of light-emitting diodes, each at one end of said cylindrical second light guide.

13. The lighting system according to claim 11, in which said first luminous source is configured to emit a change-of-direction indicator light flux.

14. The lighting system according to claim 11, in which said second luminous source is configured to emit a daytime running lighting flux.

15. The optical device according to claim 1, in which said first light guide comprises a sheet-shaped principal propagation zone.

16. The optical device according to claim 1, in which said second light guide is a cylindrical guide.

17. The optical device according to claim 1, in which said exit face comprises a relief for deviating said light rays passing through said exit portion.

18. The optical device according to claim 2, in which said exit face comprises a relief for deviating said light rays passing through said exit portion.

19. The lighting system according to claim 12, in which said second luminous source is configured to emit a daytime running lighting flux.

20. The optical device according to claim 1, in which said prolongation defines an entrance surface for light rays exiting from an exit surface of said second light guide and in which said first light guide comprises a sheet-shaped principal propagation zone.

* * * * *